United States Patent
Matsumura

(10) Patent No.: US 11,604,452 B2
(45) Date of Patent: Mar. 14, 2023

(54) DISTRIBUTED MOTOR CONTROL SYSTEM, MOTOR CONTROL DEVICE, AND DISTRIBUTED MOTOR CONTROL METHOD

(71) Applicant: KABUSHIKI KAISHA YASKAWA DENKI, Kitakyushu (JP)

(72) Inventor: Isamu Matsumura, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 178 days.

(21) Appl. No.: 17/118,892

(22) Filed: Dec. 11, 2020

(65) Prior Publication Data
US 2021/0191369 A1    Jun. 24, 2021

(30) Foreign Application Priority Data
Dec. 23, 2019 (JP) .............................. JP2019-231776

(51) Int. Cl.
G05B 19/4155     (2006.01)

(52) U.S. Cl.
CPC ..................... *G05B 19/4155* (2013.01); *G05B 2219/34013* (2013.01)

(58) Field of Classification Search
CPC ..... G05B 19/4155; G05B 2219/34013; H02M 7/493; H02P 5/74
USPC ................................................ 318/562, 560
See application file for complete search history.

(56) References Cited

U.S. PATENT DOCUMENTS

| | | | | |
|---|---|---|---|---|
| 6,625,498 B1* | 9/2003 | Kurakake | .......... | G05B 19/4141 700/20 |
| 7,119,505 B2* | 10/2006 | Komaki | .............. | G05B 19/408 370/452 |
| 7,183,736 B1* | 2/2007 | Chou | ................. | G05B 19/4141 318/575 |
| 7,944,157 B2* | 5/2011 | Worrall | ................. | H04L 12/437 318/67 |
| 2013/0041510 A1 | 2/2013 | Kurakake et al. | | |
| 2016/0239008 A1 | 8/2016 | Tanaka et al. | | |
| 2018/0109207 A1 | 4/2018 | Oka et al. | | |

(Continued)

FOREIGN PATENT DOCUMENTS

| | | |
|---|---|---|
| JP | 2008-178236 A | 7/2008 |
| JP | 2018-068094 A | 4/2018 |

OTHER PUBLICATIONS

Extended European Search Report dated May 14, 2021 in European Patent Application No. 20213742.8, 7 pages.

(Continued)

*Primary Examiner* — David Luo
(74) *Attorney, Agent, or Firm* — Oblon, McClelland, Maier & Neustadt, L.L.P.

(57) ABSTRACT

A distributed motor control system includes motor control devices that individually control motors that coordinately drive an industrial machine. Each of at least two motor control devices of the motor control devices includes processing circuitry that performs sharing processing including sharing coordinated control data, used in coordinated driving of the industrial machine between the at least two motor control devices, via data communication, and control a corresponding motor using the coordinated control data shared via the sharing-processing.

20 Claims, 12 Drawing Sheets

(56) References Cited

U.S. PATENT DOCUMENTS

2019/0384260 A1   12/2019   Glow

OTHER PUBLICATIONS

Office Action dated Apr. 9, 2020 in corresponding Japanese Patent Application No. 2019-231776, filed Dec. 23, 2019 (with computer-generated English translation), 8 pages.
European Office Action dated May 18, 2022 in European Patent Application No. 20213742.8, 7 pages.

* cited by examiner

FIG. 5

| Coordinated control data | |
|---|---|
| Operation period T | ○○.○○sec |
| Intra-period time position t | ××.××% |
| Sensor data (Workpiece dimension) | △△.△△mm |
| Sensor data (Switch) | OFF |
| ... | ... |

DISTRIBUTED MOTOR CONTROL SYSTEM, MOTOR CONTROL DEVICE, AND DISTRIBUTED MOTOR CONTROL METHOD

CROSS-REFERENCE TO RELATED APPLICATIONS

The present application is based upon and claims the benefit of priority to Japanese Patent Application No. 2019-231776, filed Dec. 23, 2019, the entire contents of which are incorporated herein by reference.

BACKGROUND OF THE INVENTION

Field of the Invention

Embodiments disclosed herein relate to a distributed motor control system, a motor control device, and a distributed motor control method.

Description of Background Art

Japanese Patent Application Laid-Open Publication No. 2008-178236 describes an inverter having an execution code part and a CPU, the execution code part including an application part, which connects a combination of multiple execution codes/functions/blocks with parameters, and a motor control part, and the CPU executing the execution codes. Then, multiple inverters each having such a structure are prepared, and inputs and outputs of the multiple inverters are connected by communication, and thereby, a PLC (Programmable Logic Controller) originally connected to an upper level of the multiple inverters is omitted. The entire contents of this publication are incorporated herein by reference.

SUMMARY OF THE INVENTION

According to one aspect of the present invention, a distributed motor control system includes motor control devices that individually control motors that coordinately drive an industrial machine. Each of at least two motor control devices of the motor control devices includes processing circuitry that performs sharing processing including sharing coordinated control data, used in coordinated driving of the industrial machine between the at least two motor control devices, via data communication, and control a corresponding motor using the coordinated control data shared via the sharing-processing.

According to another aspect of the present invention, a motor control device for controlling one of motors that coordinately drive an industrial machine includes processing circuitry that performs sharing processing including sharing coordinated control data with other motor control devices via data communication, and control the one of the motors using the coordinated control data shared via the sharing processing. The coordinated control data is used in coordinated driving with the other motor control devices that coordinately drive the industrial machine with the motor control device.

According to yet another aspect of the present invention, a distributed motor control method executed by a distributed motor control system having motor control devices that individually control motors that coordinately drive an industrial machine includes sharing, via data communication between at least two motor control devices in the motor control devices, coordinated control data used in coordinated driving of the industrial machine, and respectively controlling corresponding motors by the at least two motor control devices using the shared coordinated control data.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5 illustrates an example of a data content of coordinated control data;

DETAILED DESCRIPTION OF THE EMBODIMENTS

Figure 1:
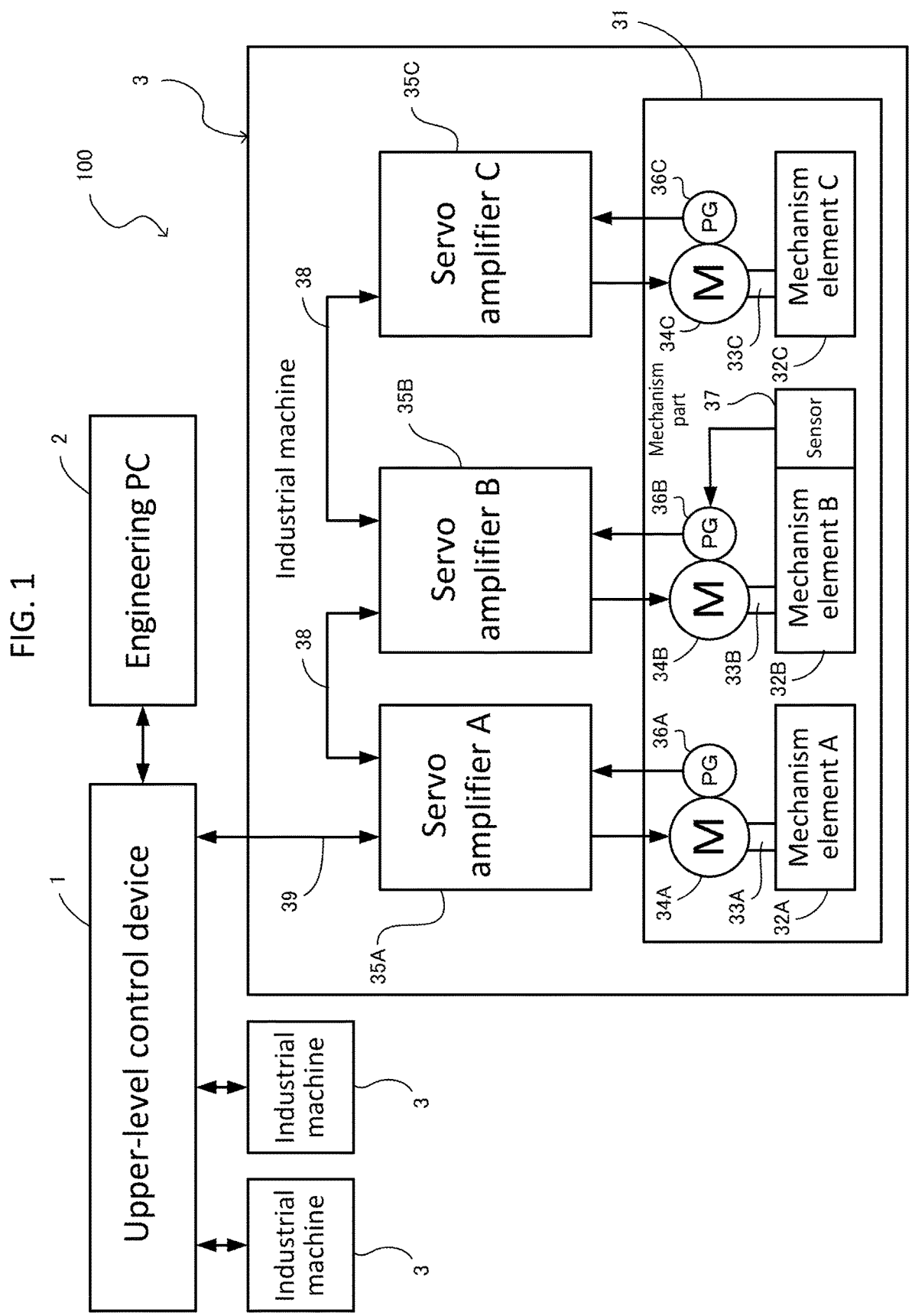
FIG. 1 is an explanatory diagram illustrating an example of an overall structure of a distributed motor control system according to an embodiment of the present invention.

Embodiments will now be described with reference to the accompanying drawings, wherein like reference numerals designate corresponding or identical elements throughout the various drawings.

1. Overall Structure of Distributed Motor Control System

First, an example of a structure of a distributed motor control system according to an embodiment of the present invention is described with reference to FIG. 1. FIG. 1 illustrates an example of an overall structure of the distributed motor control system according to the present embodiment. In the example of the present embodiment illustrated in FIG. 1, a case is described in which, for example, an industrial machine that performs a predetermined process with respect to a workpiece is coordinately controlled using multiple drive axes.

The distributed motor control system 100 includes an upper-level control device 1, an engineering PC 2, and industrial machines 3.

The upper-level control device 1 is an upper-level control device that is formed of a computer having a CPU, a memory (such as an ROM or an RAM) and the like, or a PLC (Programmable Logic Controller) or the like, and, for example, as illustrated in FIG. 1, integrally controls the multiple industrial machines 3 by outputting integrated control data (integrated control command) that commands a start of a processing operation or a schematic control content to each of the multiple industrial machines 3. This integrated control data will be described in detail later.

The engineering PC 2 is an external device that is formed of a personal computer having a CPU, a memory (such as an ROM or an RAM), an operation part, a display part, and the like, or is formed a dedicated tool, and, as will be described later, edits and creates a control operation program that indicates a control content of a time-series or conditional coordinated control of the multiple drive axes that are provided for each corresponding industrial machine 3. The control operation program will also be described in detail later.

Each of the industrial machines 3 is a mechanical system that includes multiple mechanism elements 32 respectively driven by motors 34 via drive axes, and performs a predetermined process by coordinated drive of the multiple mechanism elements 32. The industrial machines 3 in the example of the present embodiment are described using as an example a case where, as described above, the industrial machines 3 are each an industrial mechanical system that performs a predetermined process such as a machining process or a measurement with respect to a workpiece.

2. Detailed Structure of Industrial Machine

Details of an internal hardware structure of each of the industrial machine 3 are described below. In the example of the present embodiment illustrated in FIG. 1, a mechanism part 31 of a mechanical component in each of the industrial machines 3 includes three mechanism elements (32A, 32B, 32C) that are each a movable element. The mechanism part 31 further includes three motors (34A, 34B, 34C) that respectively individually drive the mechanism elements (32A, 32B, 32C) via drive axes (33A, 33B, 33C), and servo amplifiers (35A, 35B, 35C) that respectively individually control power supply of drive power for the motors (34A, 34B, 34C). Further, the motors (34A, 34B, 34C) respectively have encoders (36A, 36B, 36C) that respectively detect output positions thereof, and the encoders (36A, 36B, 36C) respectively output detected values to the corresponding servo amplifiers (35A, 35B, 35C). Further, when necessary, one of the mechanism elements (the mechanism element (32B) in the example illustrated in FIG. 1) is provided with a sensor 37. A detected value related to a mechanism element or a workpiece or the like detected by the sensor 37 is input to the servo amplifier (35B) via the corresponding encoder (36B).

The servo amplifiers (35A, 35B, 35C) are motor control devices that are each formed of a computer (see FIG. 12) having a CPU, a memory (such as an ROM, an RAM, or a flash memory) and the like, and respectively supply drive power to and drive-control the corresponding motors (34A, 34B, 34C) based on two control functions: coordinated control between the drive axes by an axis operation control part 51 (to be described later) and motor control by a motor control part 52 (to be described later).

Further, in the example illustrated in FIG. 1, three servo amplifiers (35A, 35B, 35C) are connected in the order of "A-B-C" in a series connection structure (so-called daisy chain connection structure) so as to be able to transmit or receive information to or from each other. Such a communication path for performing data communication between the servo amplifiers is hereinafter referred to as an inter-amplifier communication path 38 (corresponding to a second communication path). Further, in the example illustrated in FIG. 1, separately from the above inter-amplifier communication path 38, only the servo amplifier (35A) is connected to the upper-level control device 1 so as to be able to transmit or receive information to or from the upper-level control device 1. Such a communication path for performing data communication between the upper-level control device 1 and the specific servo amplifier (35A) is hereinafter referred to as an upper-level communication path 39 (corresponding to a first communication path).

Figure 2:
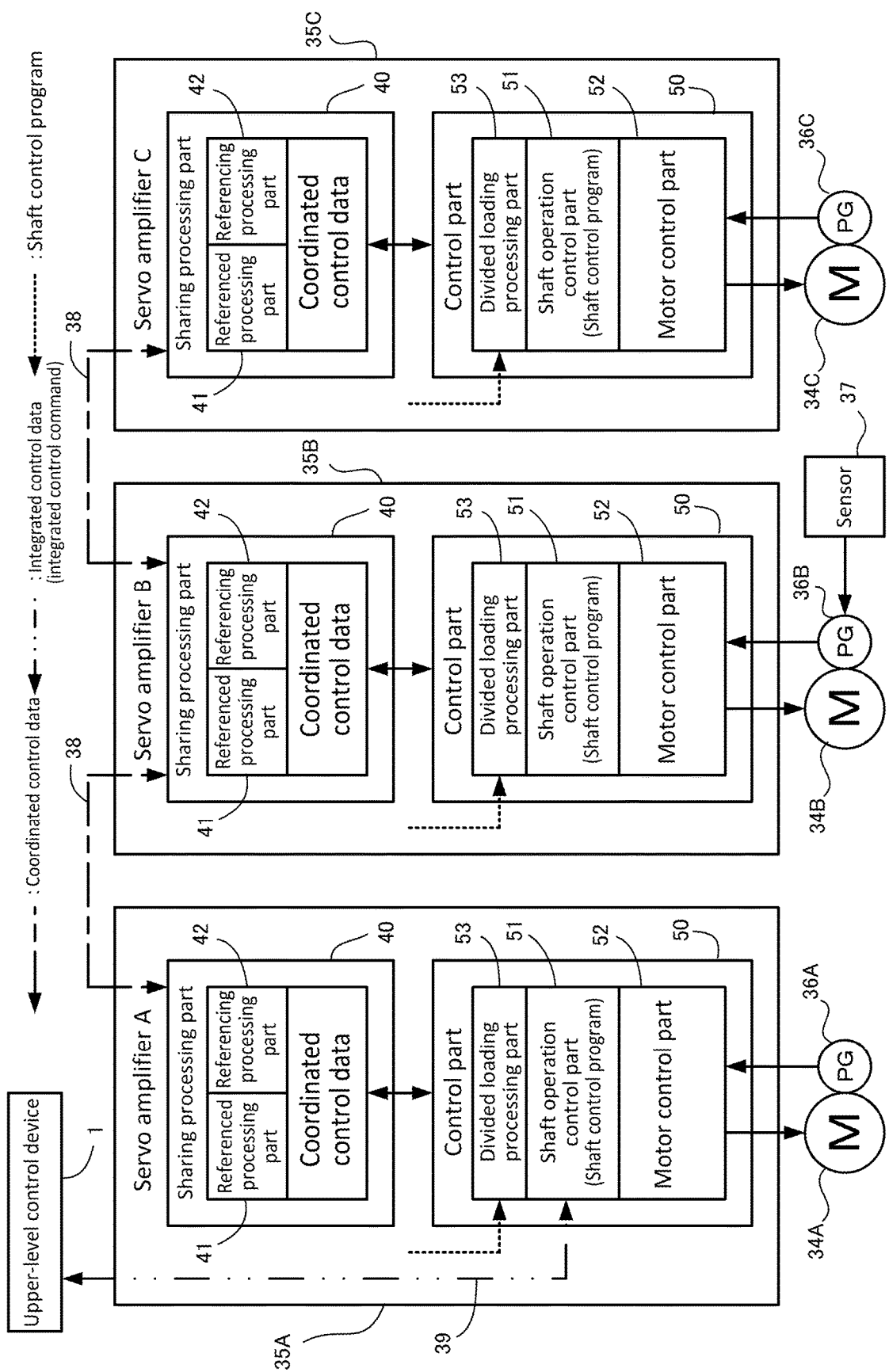
FIG. 2 is a functional block diagram illustrating software functional structures of servo amplifiers.

Next, with reference to FIG. 2, software functional structures of the servo amplifiers (35A, 35B, 35C) inside each of the industrial machines 3 are described in detail. As illustrates in FIG. 2, in the example of the present embodiment, all the three servo amplifiers (35A, 35B, 35C) have nearly the same common structures as software functional structures, and the common functional structures are described below. The servo amplifiers (35A, 35B, 35C) each have a sharing processing part 40 and a control part 50.

The sharing processing part 40 (first sharing processing part) is a functional part that performs sharing processing for sharing coordinated control data via the inter-amplifier communication path 38 between the servo amplifiers (35A, 35B, 35C) provided in this industrial machine 3, and has a referenced processing part 41 and a referencing processing part 42. The coordinated control data is data processed by the axis operation control part 51 (to be described later), and is recorded and managed in a predetermined dedicated storage area allocated on the memory of this servo amplifier (35A, 35B, 35C) by the referenced processing part 41 and the referencing processing part 42. The data content of the coordinated control data will be described in detail later.

The referenced processing part 41 performs processing to render the coordinated control data referenceable by servo amplifiers (35A, 35B, 35C) other than this servo amplifier (35A, 35B, 35C) via data communication via the inter-amplifier communication path 38. Specifically, the referenced processing part 41 performs processing so as to enable the axis operation control part 51 (to be described later) to read and rewrite the coordinated control data, and to return the coordinated control data in response to a request from the referencing processing part 42 of another servo amplifier (35A, 35B, 35C).

The referencing processing part 42 performs processing so as to reference, via data communication via the inter-amplifier communication path 38, the coordinated control data that that has been recorded in and has been rendered referenceable by a servo amplifier (35A, 35B, 35C) other than this servo amplifier (35A, 35B, 35C). Specifically, with respect to a referenced processing part 41 of another servo amplifier (35A, 35B, 35C) that is set in advance as a reference target, the referencing processing part 42 performs processing so as to request transmission of coordinated control data recorded in the servo amplifier (35A, 35B, 35C) of the reference target, and to overwrite with the returned coordinated control data the coordinated control data in the same storage area on the memory of this servo amplifier (35A, 35B, 35C).

The control part 50 is a functional part that controls the corresponding motor (34A, 34B, 34C) using the coordinated control data that has been sharing-processed by the sharing processing part 40, and includes the axis operation control part 51, the motor control part 52, and a divided loading processing part 53.

The axis operation control part 51 performs sequence control for realizing coordinated drive with the other servo amplifiers (35A, 35B, 35C) of this industrial machine 3 by using the coordinated control data recorded and managed by the sharing processing part 40. Specifically, the axis operation control part 51 reads the coordinated control data recorded in this servo amplifier (35A, 35B, 35C), and outputs various command values (a position command, a speed command, a torque command, and the like) for motor control according to a sequence in an axis control program loaded separately using the coordinated control data as a parameter. The axis control program is a program uniquely assigned to this servo amplifier (35A, 35B, 35C) regarding the drive of the drive axis (mechanism element) corresponding to this servo amplifier (35A, 35B, 35C). In the example of the present embodiment, the divided loading processing part 53 loads only the corresponding axis control program in advance from the engineering PC 2 via the upper-level control device 1, the upper-level communication path 39, and the inter-amplifier communication path 38 (detailed illustration in the drawings is omitted). The axis control program may be loaded via various routes such as loading by directly connecting the engineering PC 2 to the servo amplifiers (35A, 35B, 35C) without going through the communication paths. Further, the axis control program will also be described in detail later. Further, when necessary, the axis operation control part 51 also uses sensor data input from the sensor 37 as a parameter. Further, when necessary, the axis operation control part 51 rewrites predetermined data in the coordinated control data via the referenced processing part 41.

The motor control part 52 controls the drive power supplied to the motor following the various command values of the motor control output by the axis operation control part 51 in real time and with high accuracy while referencing the detection value output from the encoder 36. The function of the motor control part 52 is realized by executing a motor control program (to be described later) which is separately stored in advance.

Further, as described above, while the servo amplifiers (35A, 35B, 35C) have common functional structures, only the axis operation control part 51 of the servo amplifier (35A) in the example illustrated in the drawings can directly use the integrated control data (integrated control command) input from the upper-level control device 1 via the upper-level communication path 39.

In the structure of the distributed motor control system 100 of the present embodiment having the above-described structure, although the upper-level control device 1 is provided that is positioned at an upper level of the multiple industrial machines 3 and integrally controls the multiple industrial machines 3, inside each of the industrial machine 3, only the multiple servo amplifiers (35A, 35B, 35C) are provided that are in a control relationship of substantially the same level, in other words, an upper-level control device that directly controls each one of the multiple servo amplifiers (35A, 35B, 35C) is not provided.

The division of the processes performed in the upper-level control device 1, the engineering PC 2, the servo amplifiers (35A, 35B, 35C) and the like described above is not limited to the above example. For example, these processes may be performed by a smaller number of control devices, or may be performed by a larger number of further differentiated devices. Further, the processes of the servo amplifiers (35A, 35B, 35C) may be implemented by a program executed by a CPU 901 (see FIG. 12) (to be described later), or some of the processes or all the processes may be implemented by an actual device such as an application specific integrated circuit (such as an ASIC or FPGA), or other electrical circuits.

3. Using a Multi-Core Processor

Here, as described above, the processing content of the control part 50 in each of the servo amplifiers (35A, 35B, 35C) includes performing coordinated control of an axis operation by the axis operation control part 51 and performing motor control by the motor control part 52. However, the processing loads of the axis operation control part 51 and the motor control part 52 are relatively large, and it is possible that a sufficient execution speed is not obtained when the processing loads are executed alternately in time division by one CPU core. On the other hand, in the example of the present embodiment, a case is described where a form of a multi-core processor 61 having multiple cores as illustrated in FIG. 3 is used as the CPU of each of the servo amplifiers (35A, 35B, 35C).

Figure 3:
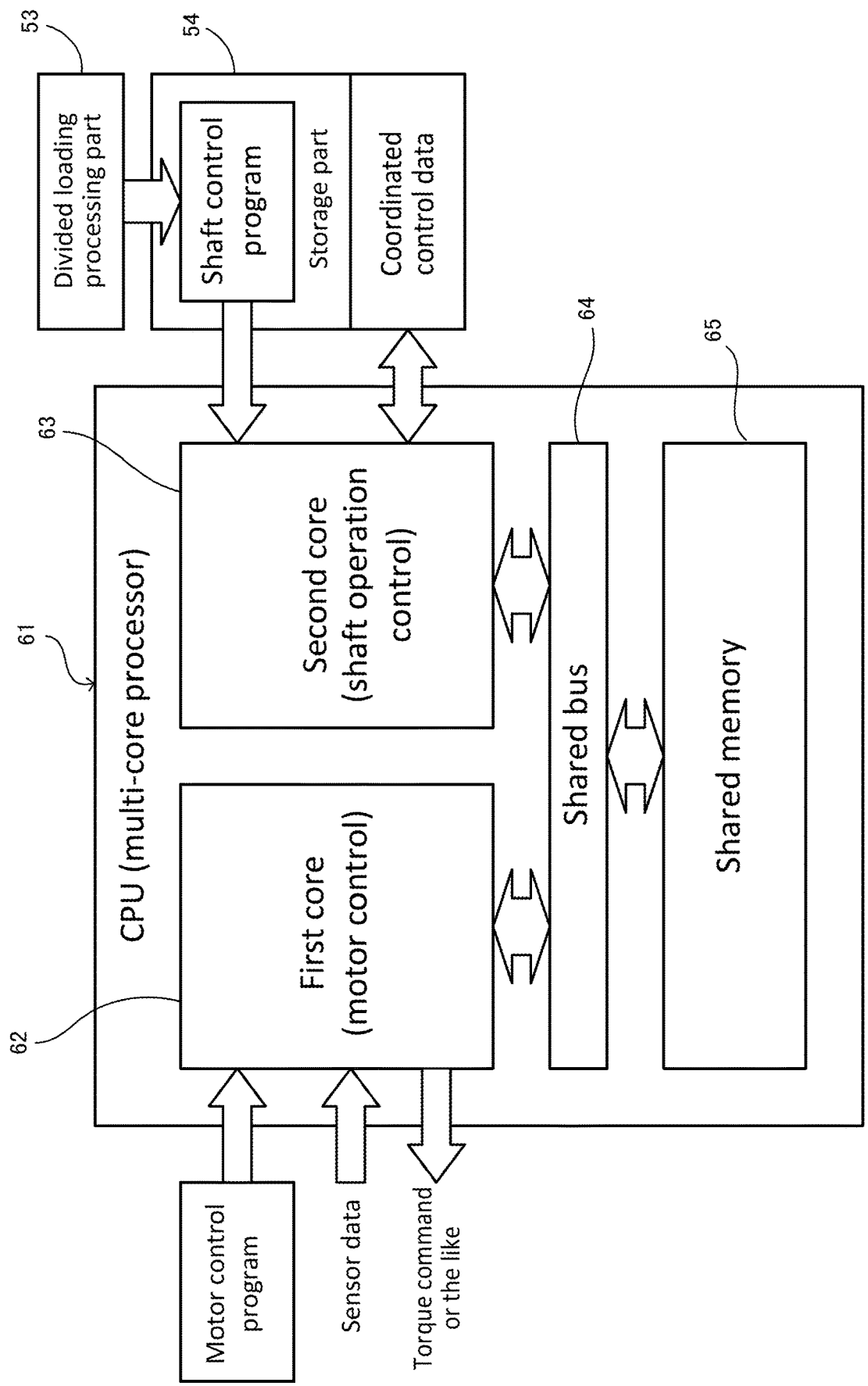
FIG. 3 illustrates a structural content of a multi-core processor used as a CPU of a servo amplifier.

The multi-core processor 61 in the example illustrated in FIG. 3 has two cores: a first core 62 and a second core 63, and the two cores (62, 63) share and process the same data temporarily recorded in a shared memory 65 via a shared bus 64 inside this processor 61. In this example, the first core 62 implements a function (corresponding to a basic function) as the motor control part 52 by executing a motor control program (corresponding to a first program) adjusted to match mechanical characteristics of the corresponding mechanism element 32. In this case, the first core 62 references sensor data from the encoder 36 and outputs a torque command (current command) or the like corresponding to the drive power to the motor 34.

Further, the second core 63 implements a function (corresponding to a use-specific application) as the axis operation control part 51 by executing an axis control program (corresponding to a second program) loaded corresponding to this servo amplifier (35A, 35B, 35C). The axis control program is loaded by the divided loading processing part 53 corresponding to this servo amplifier (35A, 35B, 35C) in a storage part 54 set in a storage area different from that of the coordinated control data in the memory.

Then, various command values of the motor control output by the processing of the axis operation control part 51 by the second core 63 are used in the processing of the motor control part 52 by the first core 62 via the shared bus 64 and the shared memory 65. Further, sensor data acquired by the first core 62 or a torque command output by the first core 62 may be shared with the second core 63 via the shared bus 64 and the shared memory 65. With the above structure of the multi-core processor 61, the processing of the motor control part 52 by the first core 62 and the processing of the axis operation control part 51 by the second core 63 can be executed in parallel (simultaneously).

The number of the cores provided in the multi-core processor 61 is not limited to two, but may be three or more. In this case, all the cores that share the processing of the motor control part 52 correspond to a first area described in the claims, and all the cores that share the processing of the axis operation control part 51 correspond to a second area described in the claims.

Figure 4:
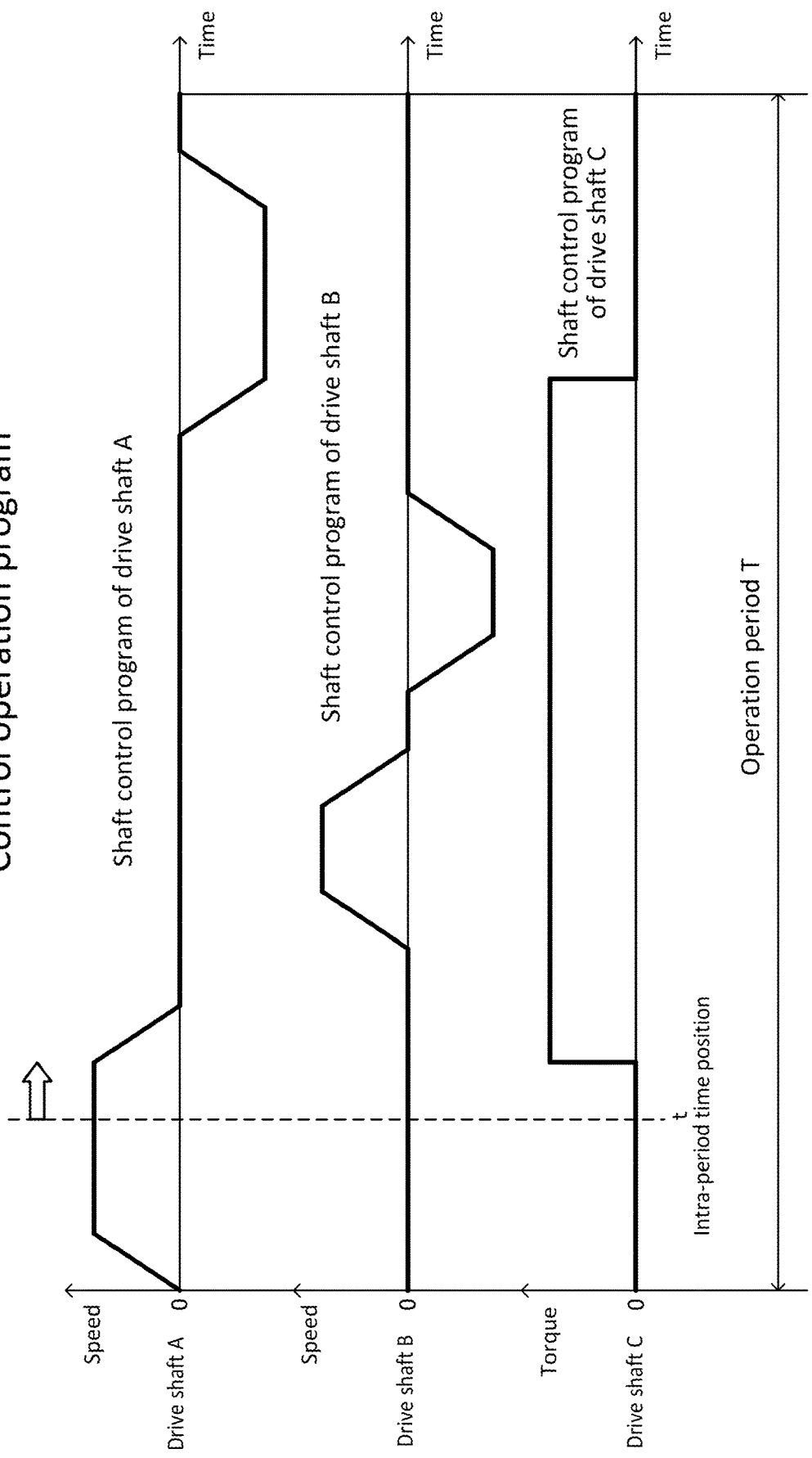
FIG. 4 displays a time sequence chart of a control operation program that is displayed and edited in a display part of an engineering PC.

4. Control Operation Program, Axis Control Programs, and Coordinated Control Data FIG. 4 illustrates an example of a time sequence chart of a control operation program that is displayed and edited in the display part of the engineering PC 2. In the example illustrated in FIG. 4, an axis control program of a drive axis A defining a speed change sequence of the drive axis (33A), an axis control program of a drive axis B defining a speed change sequence of the drive axis (33B), and an axis control program of a drive axis C defining a torque change sequence of the drive axis (33C) are each displayed and edited in a form of a geometric time series linear graph. Although not particularly illustrated in the drawings, for example, a form of editing using a ladder diagram or using a command line description format is also possible.

Axis control programs respectively corresponding to the multiple drive axes (33A, 33B, 33C) are edited by a designer (user) of a manufacturer of an industrial machine 3 according to a structural content of the industrial machine 3, and the engineering PC 2 collectively edits and creates the axis control programs of the multiple drive axes (33A, 33B, 33C) included in one industrial machine 3 as one control operation program. In the example of the present embodiment, the axis control programs of the control operation program divided for the drive axes (33A, 33B, 33C) are respectively loaded to the storage parts 54 by the divided loading processing parts 53 of the corresponding servo amplifiers (35A, 35B, 35C).

Here, in the example of the present embodiment, assuming that the industrial machines 3 each periodically repeat execution of the same process with respect to each of a large number of workpieces that are sequentially supplied thereto, a time period spent for executing the process once is defined as an operation period (T), and a relative time position elapsed from the start timing of the operation period (T) (for example, an elapsed percentage of the operation period (T), or the like) is defined as an intra-period time position (t). In this case, in order to realize smooth coordinated control between the drive axes in this industrial machine 3, at least data including the operation period (T) and the intra-period time position (t) must be shared and synchronized as synchronization data between the servo amplifiers (35A, 35B, 35C) respectively corresponding to the drive axes (33A, 33B, 33C).

Further, in some cases, the sensor data input to the servo amplifier (35B) in this example may need to be shared and used by the other servo amplifier (35C). Specifically, in some cases, a measured value of a dimension different for each individual of a large number of workpieces supplied, an ON or OFF stte of a switch detecting a behavior of a specific mechanism element 32, or the like may need to be used in the coordinated control between the multiple drive axes.

In the present embodiment, all data sets that need to be shared between at least two servo amplifiers among the servo amplifiers (35A, 35B, 35C), such as the operation period (T), the intra-period time position (t) and the sensor data described above, are collectively combined into one set of coordinated control data as illustrated in FIG. 5, and this is shared and stored by the sharing processing parts 40 of the servo amplifiers (35A, 35B, 35C). In this case, the multiple element data sets that form the coordinated control data are each rewritten by only one responsible servo amplifier 35, and the other servo amplifiers 35 only need to reference the data, and thereby, identity between the coordinated control data sets that are respectively managed by the servo amplifiers (35A, 35B, 35C) can be ensured. For example, only the servo amplifier (35A) in this example sequentially modifies the value of the operation period (T) based on the integrated control data input from the upper-level control device 1, and only the servo amplifier (35A) performs count correction of the intra-period time position (t) based on a start command of the coordinated control included in the integrated control data. Further, on the other hand, the other servo amplifiers (35B, 35C) only perform processing by referencing the synchronization data of their operation period (T) and intra-period time position (t). As a result, by only outputting the integrated control data that modifies the operation period (T) from the upper-level control device 1 in an integrated way, coordinated drive that maintains synchronization is possible while a processing takt time of this entire industrial machine 3 is uniformly modified for all the drive axes (33A, 33B, 33C).

In this case, during the operation period (T), transmission and reception of the coordinated control data via the inter-amplifier communication path 38 between the servo amplifiers (35A, 35B, 35C) are repeated at a high frequency to reference the data. However, as compared to this, it is sufficient for transmission and reception of the integrated control data or other data between the upper-level control device 1 and the servo amplifier (35A) via the upper-level communication path 39 to be performed, for example, about several times during the operation period (T). Therefore, the inter-amplifier communication path 38 and the upper-level communication path 39 adopt communication forms of protocols having communication speeds different from each other, and, in particular, a protocol having a slower communication speed or communication processing cycle than that for the inter-amplifier communication path 38 is applied to the upper-level communication path 39, and thereby, an equipment load or a processing load of the servo amplifier (35A) can be reduced. Further, in this way, when an implementation cost of a structure connecting to the upper-level communication path 39 can be reduced, it can be implemented in any one of the servo amplifiers (35A, 35B, 35C), and interchangeability can be achieved between the multiple servo amplifiers (35A, 35B, 35C) used in each of the industrial machines 3.

5. Reference Process of Coordinated Control Data

Next, a reference process of the coordinated control data between the servo amplifiers (35A, 35B, 35C) in each of the industrial machines 3 is described. Here, before describing the reference process in the case of the present embodiment having the above-described structure, for example, as illustrated in FIG. 6, a reference process in a case of a comparative example in which one servo amplifier (35A) is provided with a centralized data management part 71 is described.

Figure 6:
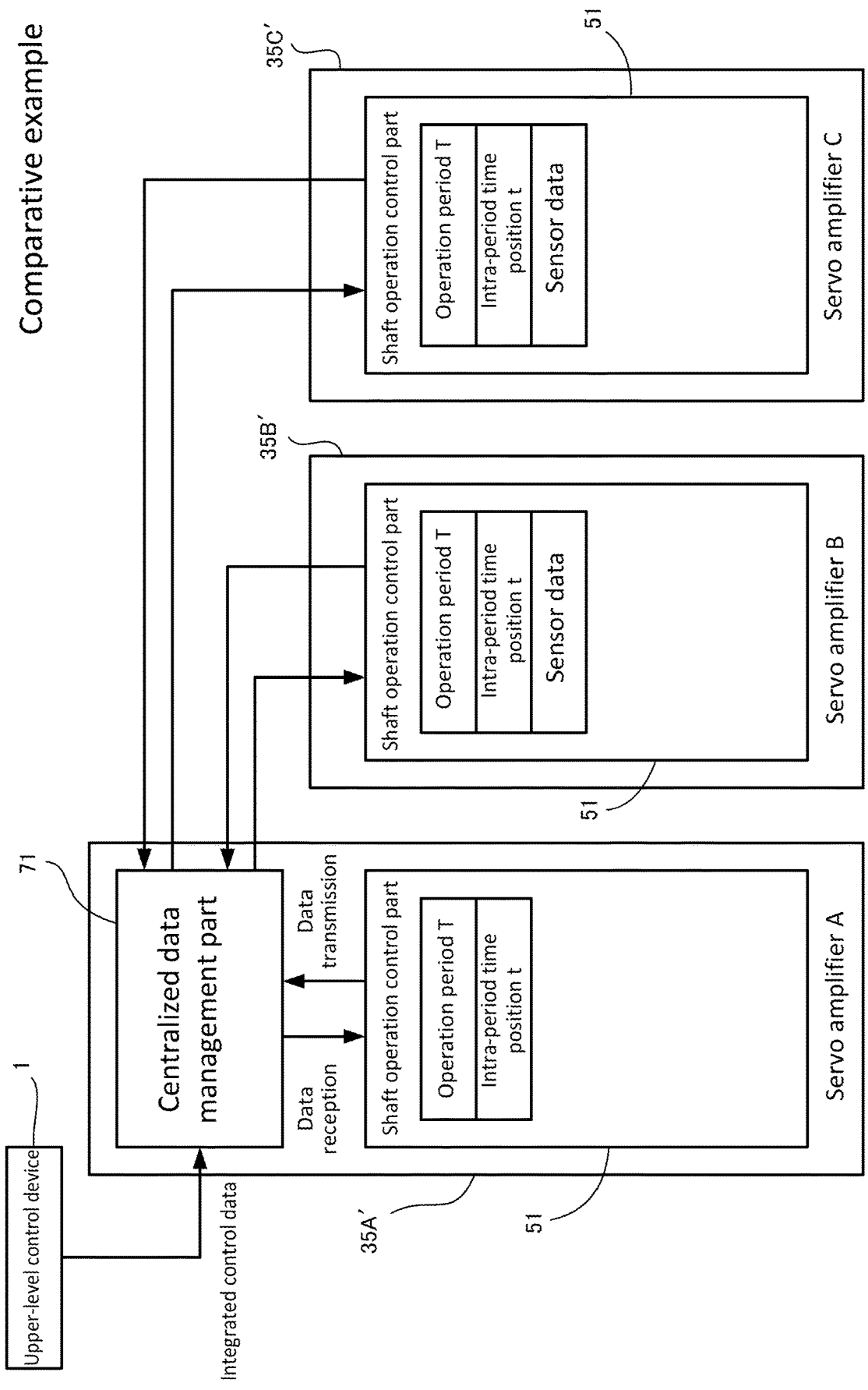
FIG. 6 illustrates a reference process in a case of a comparative example in which data transmission and reception between servo amplifiers is centralizedly managed.

In the example illustrated in FIG. 6, none of the three servo amplifiers (35A', 35B', 35C') provided in an industrial machine 3 are provided with the above-described sharing processing part 40. Instead, only the one servo amplifier (35A') has a centralized data management part 71 that connects to the upper-level control device 1 and all the other servo amplifiers (35B', 35C'). In this structure, only the centralized data management part 71 collectively and centrally performs reception of the integrated control data from the upper-level control device 1 or transmission and reception of data of the servo amplifiers (35A', 35B', 35C').

In the case of the comparative example, the centralized data management part 71 transmits the operation period (T) included in the integrated control data received from the upper-level control device 1 and the intra-period time position (t) counted by itself to all the axis operation control parts 51 of servo data at a high communication frequency, and all the axis operation control parts 51 that have received the data perform coordinated control based on the same operation period (T) and intra-period time position (t). Further, transmission and reception of sensor data and the like between the servo amplifiers (35A', 35B', 35C') are all performed via the centralized data management part 71. That is, the servo amplifier (35A') provided with the centralized data management part 71 functions as a master that manages in an integrated way the transmission and reception of data in this industrial machine 3, and the other servo amplifiers (35B', 35C') function as slaves that perform axis operation control based on the data received from centralized data management part 71.

However, as in this comparative example, in the form in which data transmission and reception are centralizedly performed, all data transmission and reception between two servo amplifiers (35') in any combination must go through the centralized data management part 71, and thus, communication loads are concentrated on the centralized data management part 71, and an excessive processing burden is likely to be imposed on the centralized data management part 71, and communication delays due to collisions in the data communication on the communication path are likely to occur. In particular, when a scale of each of the industrial machines 3 is large and the number of the drive axes 33 provided is large, adverse effects due to such processing burden and communication delays are likely to become significant.

Figure 7:
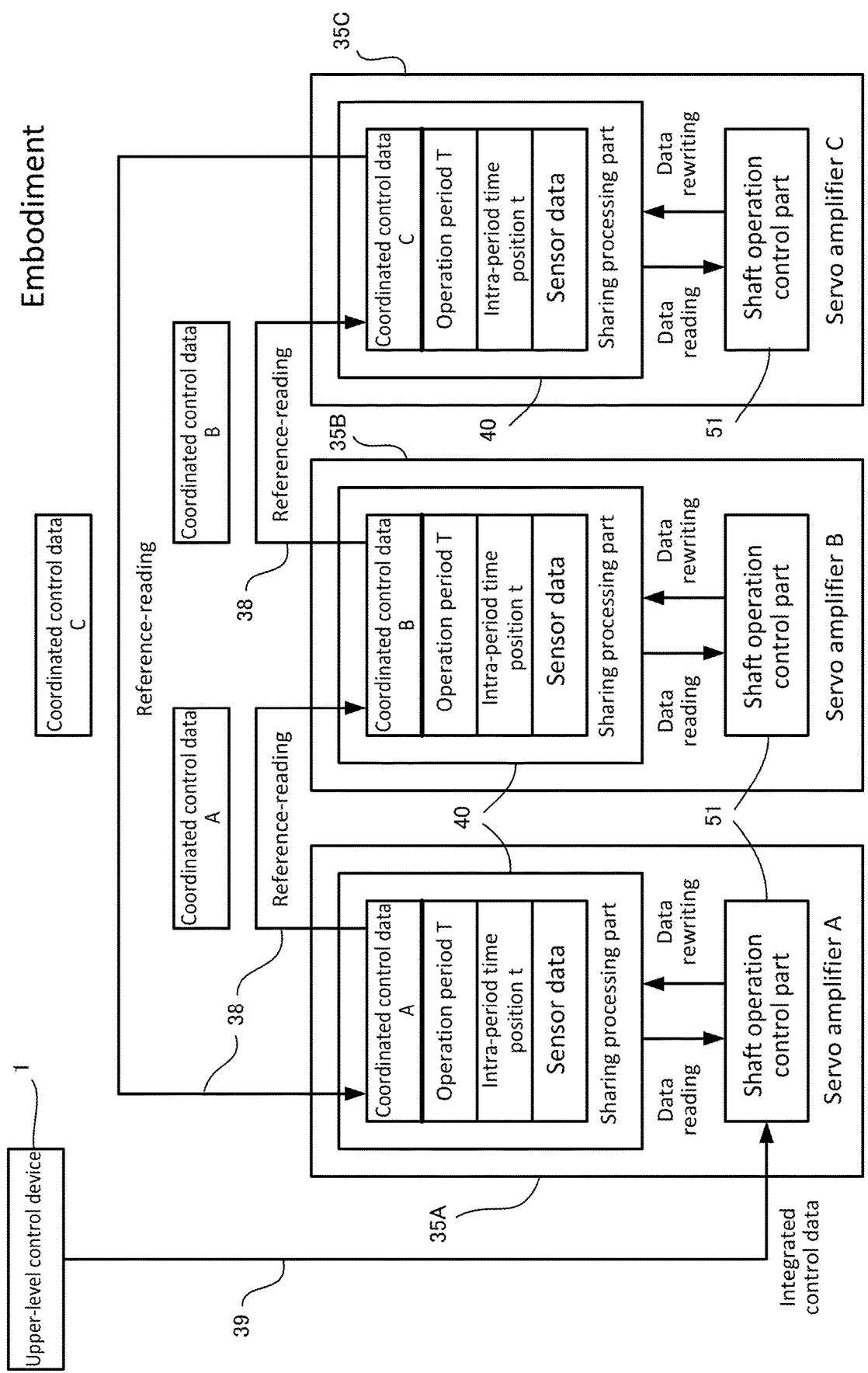
FIG. 7 illustrates a reference process in the case of the embodiment in which data transmission and reception between servo amplifiers is circulatingly performed.

In contrast, in the case of the present embodiment where the servo amplifiers (35A, 35B, 35C) each have the sharing processing part 40, for example, as illustrated in FIG. 7, by sharing the entire coordinated control data with a reference process that circulates the entire coordinated control data, all the servo amplifiers (35A, 35B, 35C) can each transmit and receive the coordinated control data smoothly and quickly with equally small communication processing burden. Regarding the reference process, specifically, the multiple servo amplifiers (35A, 35B, 35C) connected linearly in series in this example transmits and receives the coordinated control data by circulating the coordinated control data in a connection order (the order of A→B→C→A in the example illustrated in FIG. 7) in a predetermined circulation direction. That is, among two adjacent servo amplifiers 35 in the connection order, the referencing processing part 42 of the servo amplifier 35 on the downstream side reads and references the coordinated control data stored in the servo amplifier 35 on the upstream side, and the data is used to perform the axis operation control. This reference-reading is performed by the referencing processing parts 42 of the servo amplifiers (35A, 35B, 35C) in the connection order of the inter-amplifier communication path 38, and in the case of the referencing processing part 42 of the servo amplifier (35A) at the starting end, the reference-reading is performed from the servo amplifier (35C) at the ending end via the entire inter-amplifier communication path 38. Further, in the middle of this, the axis operation control parts 51 of the servo amplifiers (35A, 35B, 35C) also rewrite the data elements that they are respectively responsible for so that the servo amplifier (35A) in this example rewrites the operation period (T) and the intra-period time position (t).

In this way, in the reference process of the form in which the coordinated control data is circulated, in most cases, one reference-reading of the coordinated control data requires only one data transmission or reception process between two adjacent nodes, and thus, the processing burden of the data communication can be kept low. Further, in this reference process, even when the coordinated control data is repeatedly circulated during one operation period (T), occurrence of collisions in the data communication on the inter-amplifier communication path 38 can be suppressed, and the data can be smoothly and quickly transmitted or received. Further, since a specific servo amplifier 35 having a master function is not provided, all the servo amplifiers (35A, 35B, 35C) can be nearly equally structured to have a high interchangeability.

The reference process that circulates the coordinated control data in the connection order as described above is merely an example. As in the present embodiment, the servo amplifiers (35A, 35B, 35C) respectively have the sharing processing parts 40, the coordinated control data can be referenced with various other reference processes. That is, in a reference process, the coordinated control data may be referenced in any combination of two servo amplifiers 35 in any order (not particular illustrated in the drawing), and various reference processes may be adopted to an extent that concentration of communication loads as in the above comparative example does not occur. Further, in the present embodiment, as an example, the case is described where a connection structure (so-called network topology) in which the servo amplifiers (35A, 35B, 35C) are connected linearly in series is applied as the inter-amplifier communication path 38. However, the same effect can also be obtained in a case where a connection structure of a so-called bus type, a ring type or the like is applied.

Figure 8:
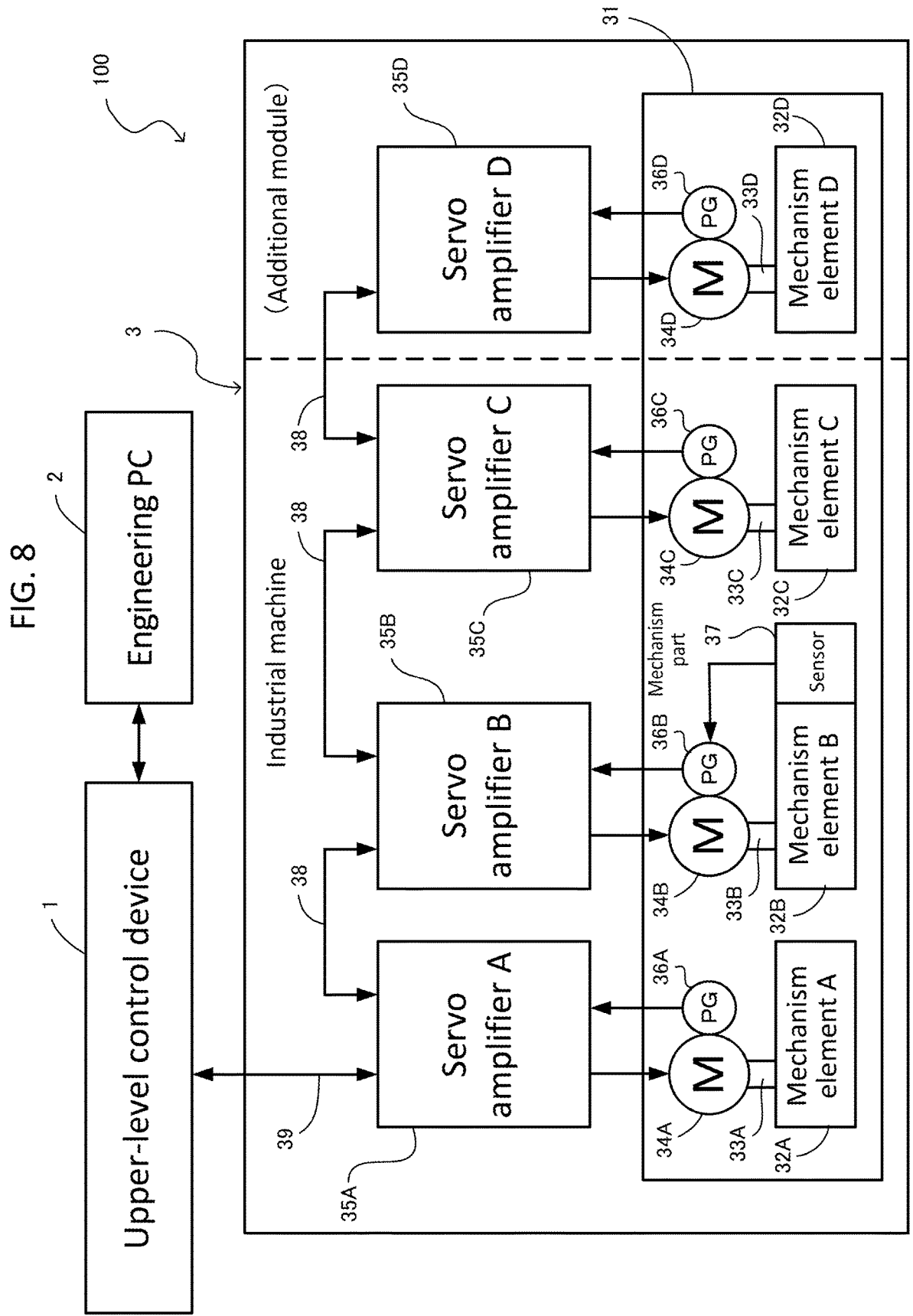
FIG. 8 illustrates a system structure of a case where an additional module including a mechanism element and a drive control system is added to an industrial machine.

Then, as described above, according to the distributed motor control system 100 of the present embodiment in which the servo amplifiers (35A, 35B, 35C) each have the sharing processing part 40, for example, as illustrated in FIG. 8, even when a new mechanism element (32D) and a corresponding drive control system (including a motor (34D) and a servo amplifier (35D)) thereof are added to an industrial machine 3, coordinated drive with the existing drive axis control system can be easily realized. For example, although not particularly illustrated in the drawing, in a case where a PLC or the like that controls the multiple servo amplifiers (35A, 35B, 35C) at an upper level thereof is provided in the industrial machine 3, in order to add a new drive control system, a complicated work such as modifying a complex control operation program executed by the PLC is required. In contrast, in the case of the present embodiment, basically, by only loading an axis control program to the servo amplifier (35D) to be added and performing wiring connection and setting of reference processes with respect to the other servo amplifiers (35A, 35B, 35C), coordinated drive with the existing drive control system can be achieved. That is, it is easy to add or remove a module unit that combines the mechanism element (32D) and the drive control system (the motor (34D) and the servo amplifier (35D)) driving the mechanism element (32D), and design flexibility regarding how to combine and structure modules in an industrial machine 3 can be improved.

6. Effects According to the Present Embodiment

As described above, in the distributed motor control system 100 of the present embodiment, at least two of the multiple servo amplifiers 35 each have a sharing processing part 40 and a control part 50. The sharing processing parts 40 perform predetermined sharing processing, and thereby, data (coordinated control data) required for the coordinated drive of the industrial machine 3 can be shared with each other between the at least two servo amplifiers 35 via data communication. The control parts 50 respectively control the motors 34 as control objects thereof using the shared coordinated control data.

In this way, by sharing the coordinated control data via data communication between the servo amplifiers 35 and using the shared coordinated control data to control the motors 34, as compared to the conventional method in which data transmission and reception is performed via one servo amplifier 35 that functions as a master (for example, the above comparative example), the communication speed between the multiple servo amplifiers 35 and the processing speed in controlling the multiple motors 34 can be greatly improved. Further, differentiation in functions such as master and slave between the multiple servo amplifiers 35 is unnecessary, and general versatility and interchangeability in individual servo amplifiers 35 can be improved.

Further, in the present embodiment, in particular, the industrial machines 3 are each formed by the multiple mechanism elements 32 that respectively have the drive axes 33. Then, the multiple servo amplifiers 35 respectively control the motors 34 that respectively drive the drive axes 33 of the mechanism elements 32. In this case, the control parts 50 of the multiple servo amplifiers 35 respectively control the motors 34 based on the multiple axis control programs corresponding to the multiple drive axes 33. As a result, even when a drive operation is different for each of the mechanism elements 32, the servo amplifiers 35 can share and perform individual drive control based on the corresponding axis control programs, and a complex sequence control in the entire industrial machine 3 can be realized.

Further, in the present embodiment, in particular, the engineering PC 2 capable of creating the control operation program including the multiple axis control programs that respectively correspond to the multiple drive axes 33 is provided. Then, each of the servo amplifiers 35 has the storage part 54 that loads, from the control operation program held in the engineering PC 2, only the axis control program related to its own control, and stores the axis control program. As a result, in distributedly controlling the multiple motors 34 respectively for the axes in a multi-axis drive type industrial machine 3, the control operation program, which is loaded from the engineering PC 2 and is to be used, can be modularized for each of the axes and used in the servo amplifiers 35 that respectively correspond to the axes.

Further, in the present embodiment, in particular, in the sharing processing, the sharing processing parts 40 of the servo amplifiers 35 share the coordinated control data processed by the axis control programs stored in the respective storage parts 54 with each other via data communication. As a result, in distributedly controlling the multiple motors 34 respectively for the axes in a multi-axis drive type industrial machine 3, the coordinated control data can be shared and used in the control of the motors 34 that respectively correspond to the axes. As a result, as compared to the above-described conventional method, the processing speed in controlling the multiple motors 34 that respectively correspond to the axes can be reliably improved.

Further, in the present embodiment, in particular, the sharing processing part 40 of each of at least two servo amplifiers 35 includes the referenced processing part 41 that performs processing such that the coordinated control data processed by the axis control program of this servo amplifier 35 can be referenced by servo amplifiers 35 other than this servo amplifier 35 via data communication. As a result, in each of the servo amplifiers 35 that respectively correspond to the axes, due to the referenced processing part 41, a state can be achieved in which the coordinated control data related to the motor control of its own control object can be referenced by other servo amplifiers 35. In the above embodiment, the referenced processing part 41 performs sharing processing so as to return the coordinated control data in response to a request from the referencing processing part 42 of another servo amplifier 35. However, the present invention is not limited to this. For example, it is also possible to perform the sharing processing based on a time schedule such as a preset periodic timing such that the coordinated control data is actively transmitted from the referenced processing part 41 to the referencing processing part 42 of a predetermined servo amplifier 35.

Further, in the present embodiment, in particular, the sharing processing part 40 of each of at least two servo amplifiers 35 includes the referencing processing part 42 that references via data communication the coordinated control data that has been processed by the axis control program of a servo amplifier 35 other than this servo amplifier 35 and has been rendered referenceable by the other servo amplifier 35. As a result, the referencing processing part 42 of each of the servo amplifiers 35 that respectively correspond to the axes can reference the coordinated control data that relates to motor control of a control object and has been rendered referenceable by another servo amplifier 35. In the above embodiment, the referencing processing part 42 performs sharing processing by requesting the referenced processing part 41 of another servo amplifier 35 to return the coordinated control data. However, the present invention is not limited to this. For example, it is also possible to perform the sharing processing based on a time schedule such as a preset periodic timing such that the referencing processing part 42 passively receives coordinated control data spontaneously transmitted from the referenced processing part 41 of a predetermined servo amplifier 35.

Further, in the present embodiment, in particular, at least two servo amplifiers 35 each further have the divided loading processing part 53 that loads from the engineering PC 2 the axis control program that is generated corresponding this servo amplifier 35 by dividing the control operation program held in the engineering PC 2, and storage part 54 stores the axis control program loaded by the divided loading processing part 53. As a result, each of the servo amplifiers 35 can load from the engineering PC 2 only the axis control program that relates to its own control and is generated by dividing the control operation program of the engineering PC 2, and can store the axis control program in the storage part 54.

Figure 9:
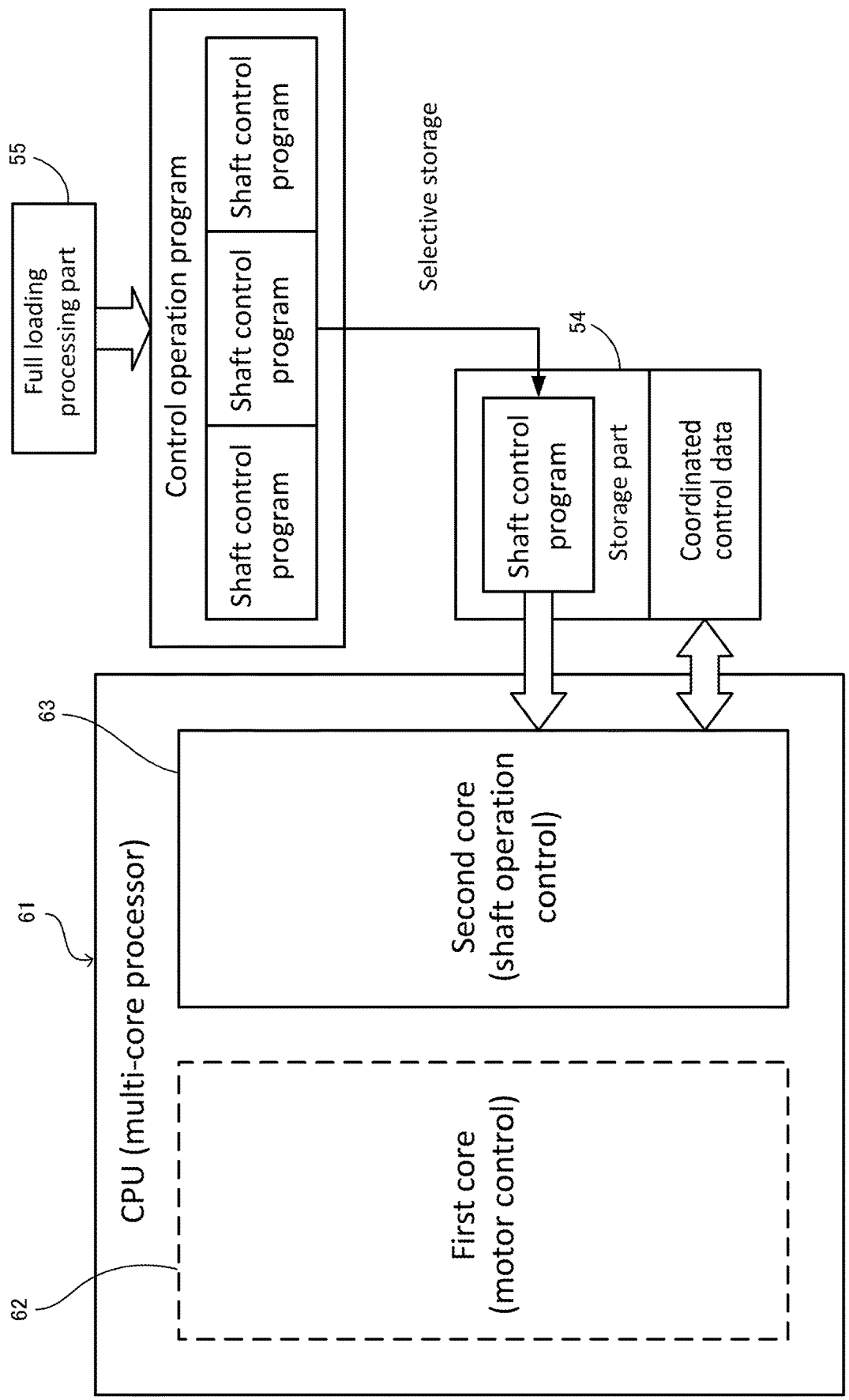
FIG. 9 illustrates a structure of a case where an entire operation control program is loaded by a full loading processing part.

Instead of the divided loading processing part 53, for example, as illustrated in FIG. 9 which corresponds to the above FIG. 2, it is also possible to provide a full loading processing part 55 that loads the entire control operation program from the engineering PC 2. In this case, only the axis control program related to its own control is selected and divided from the control operation program once loaded by the full loading processing part 55 and is stored in the storage part 54. As a result, the multiple servo amplifiers 35, in each of which the entire control operation program has been loaded, all have interchangeability capable of performing drive control of each drive axis 33, and when actual connection to a motor 34 of each drive axis 33 of an industrial machine 3 is performed, only the axis control program corresponding to this drive axis 33 (this servo amplifier 35) is selected and stored in the storage part 54.

Further, in the present embodiment, in particular, the control operation program held in the engineering PC 2 is displayed in a mode including all the multiple axis control programs in the display part of the engineering PC 2, and is structured to be editable. As a result, an operator can edit multiple axis control programs in a desired mode in the display part of the engineering PC 2. Further, as a result, for example, as described above, when the control operation program is divided to generate the axis control programs related to the control of the servo amplifiers 35, the above-described editing operation allows the above-described dividing and the generation of the axis control programs to be easily performed.

Further, in the present embodiment, in particular, the coordinated control data includes synchronization data for synchronizing the coordinated drive between the motors 34 that are respectively driven by at least two servo amplifiers 35. As a result, without relying on a centralized management as in the above comparative example, only between the servo amplifiers 35, smooth and reliable coordinated drive between the multiple drive axes in each of the industrial machines 3 is possible.

Further, in the present embodiment, in particular, the upper-level control device 1 that integrally controls the industrial machines 3 is further provided. The upper-level control device 1 has the upper-level communication path 39 for sharing the integrated control data with one of the multiple servo amplifiers 35. At least two servo amplifiers 35 included in the multiple servo amplifiers 35 have the inter-amplifier communication path 38 for sharing the coordinated control data. The communication speeds in the upper-level communication path 39 and the inter-amplifier communication path 38 are different from each other.

As a result, the inter-axis control between the multiple drive axes that coordinately drive one industrial machine 3 is performed by the multiple servo amplifiers 35 that share the coordinated control data, while the integrated control of the entire industrial machine 3 can be performed by the upper-level control device 1 by simply sharing the integrated control data with one of the multiple servo amplifiers 35. Therefore, the processing of the integrated control by the upper-level control device 1 can be simplified. Further, the communication frequency of the integrated control data shared between such a upper-level control device 1 and one servo amplifier 35 via the upper-level communication path 39 is relatively low, whereas the communication frequency of the coordinated control data shared between the multiple servo amplifiers 35 via the inter-amplifier communication path 38 is relatively high. Therefore, the upper-level communication path 39 and the inter-amplifier communication path 38 are different from each other in communication speed or in communication processing cycle (for example, the inter-amplifier communication path 38 is faster in communication speed or shorter in communication processing cycle than the upper-level communication path 39), and thereby, the large difference in communication frequency between the upper-level communication path 39 and the inter-amplifier communication path 38 can be absorbed, and both the inter-axis coordinated control and the integrated control in this industrial machine 3 can be smoothly performed.

Figure 10:
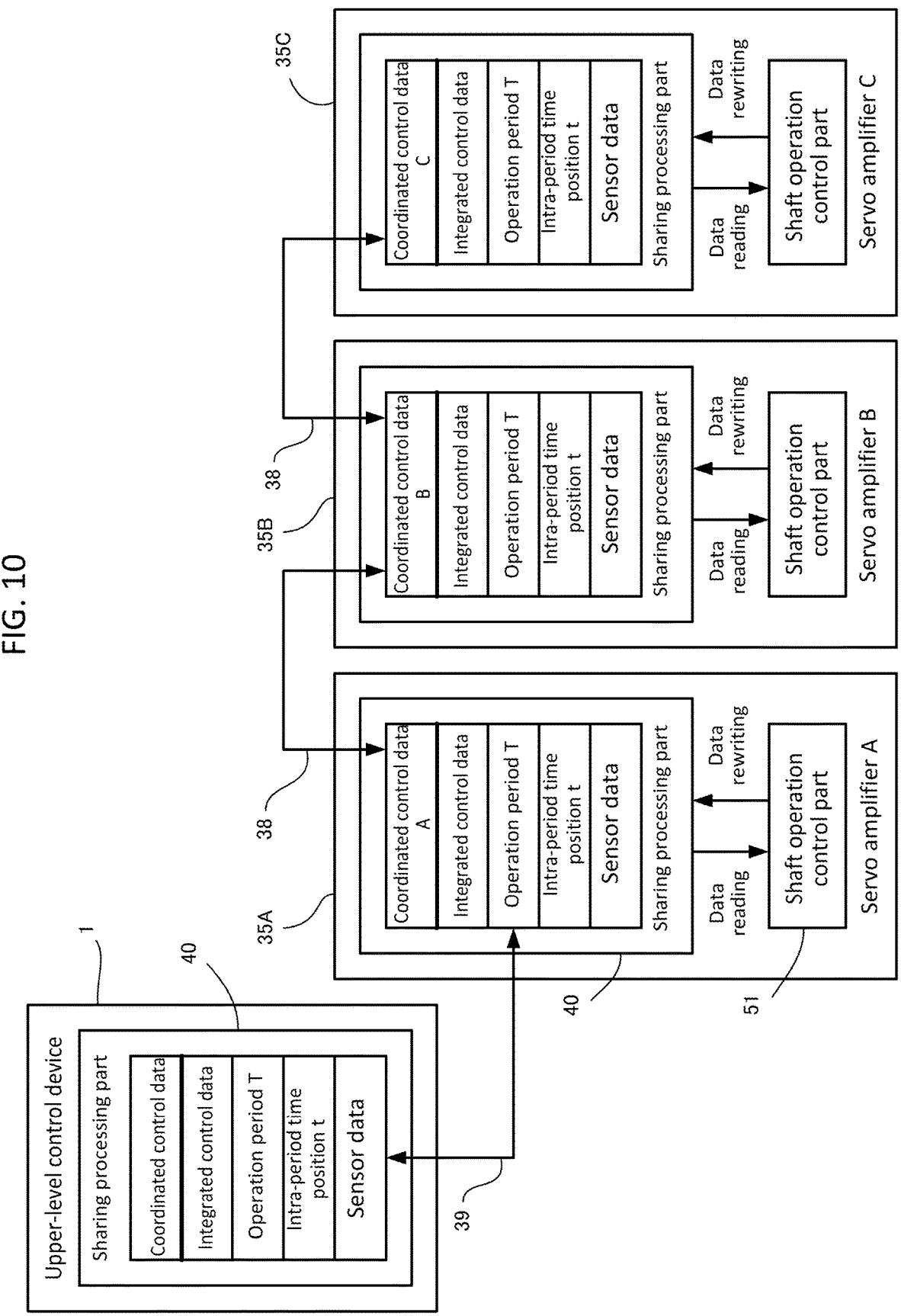
FIG. 10 is a functional block diagram of a case where an upper-level control device also shares the coordinated control data.

For example, as illustrated in FIG. 10 which corresponds to the above FIG. 7, it is also possible that the upper-level control device 1 also has the same sharing processing part 40 as the servo amplifiers 35 and shares the coordinated control data of the same content with each of the servo amplifiers 35. In this case, the integrated control data (integrated control command) that can be rewritten only by the upper-level control device 1 is included in the coordinated control data, and the entire coordinated control data is shared between the upper-level control device 1 and all the servo amplifiers 35. In this case, the synchronization data such as the operation period (T) and the intra-period time position (t) may be included in the integrated control data, and only the upper-level control device 1 performs modification and count correction of the synchronization data, and thereby, the processing burden of the servo amplifier (35A), for example, can be reduced. Although not particularly illustrated in the drawings, the upper-level control device 1 may also be connected to the servo amplifiers 35 via the inter-amplifier communication path 38, that is, the upper-level control device 1 and the multiple servo amplifiers 35 may share the coordinated control data by transmitting and receiving information in a mode of connection at the same level. As a result, the upper-level control device 1 can share the coordinated control data with the servo amplifiers 35 at the same transmission and reception frequency, and can acquire and record sensor data or an inter-axis parameter contained therein in real time.

Figure 11:
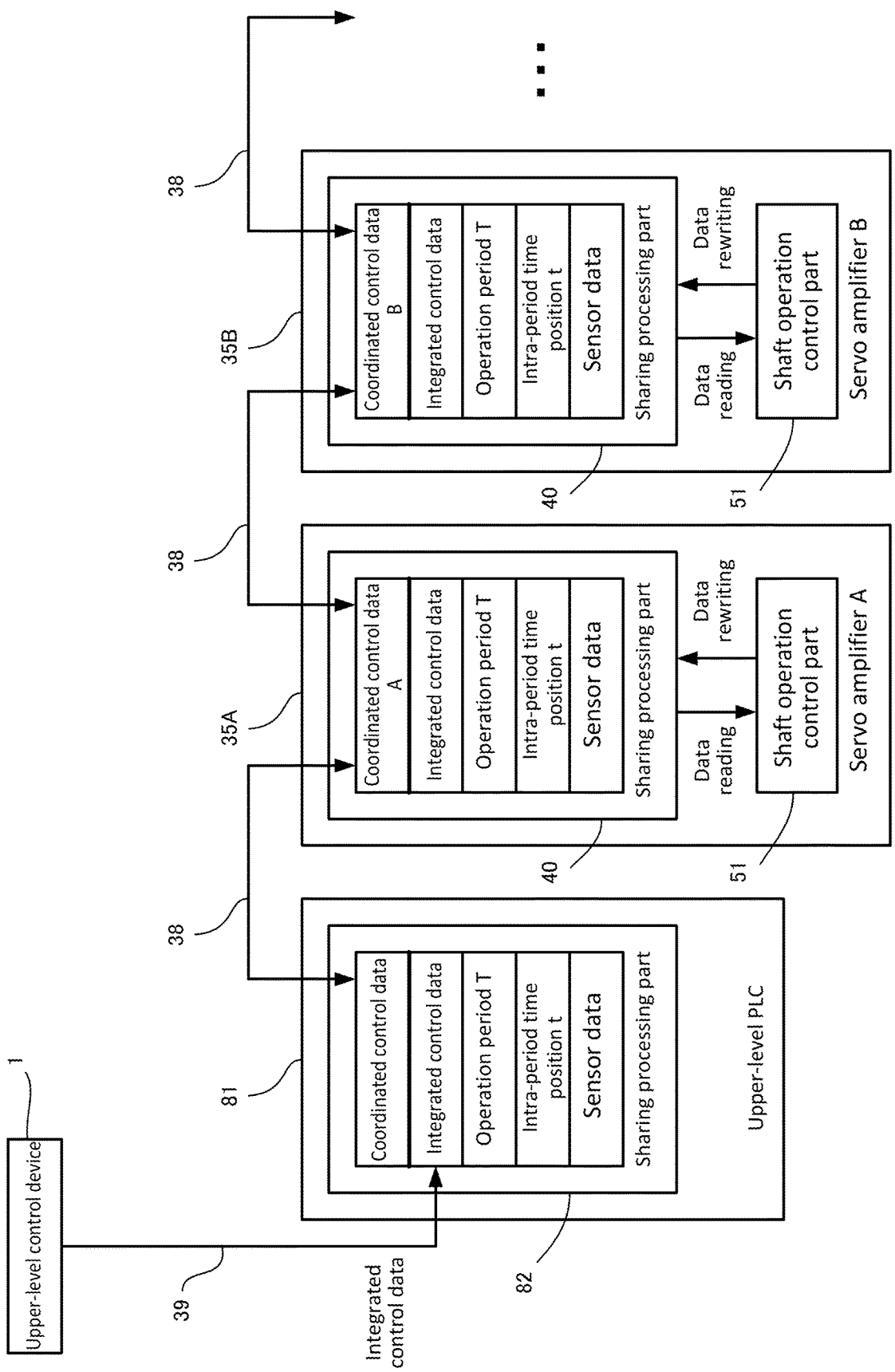
FIG. 11 is a functional block diagram of a case where an upper-level PLC that shares the coordinated control data is provided.

Further, in the above embodiment, the description is based on the assumption that, in each of the industrial machines 3, a PLC or the like that controls the multiple servo amplifiers 35 at an upper level thereof is not provided. However, the present invention is not limited to this. For example, as illustrated in FIG. 11 which corresponds to the above FIG. 10, it is also possible that an upper-level PLC 81 (equipment control device) that collectively controls the multiple servo amplifiers 35 in a predetermined industrial machine 3, and only this upper-level device PLC 81 is connected via the upper-level communication path 39 to the upper-level control device 1 that collectively controls the multiple industrial machines 3. In this case, the upper-level PLC 81 has a sharing processing part 82 (second sharing processing part: including a referenced processing part and a referencing processing part), and performs sharing processing of the coordinated control data with the other servo amplifiers 35 via the inter-amplifier communication path 38, and performs upper-level control with respect to the drive axes (servo amplifiers 35) by sharing the coordinated control data. In this case, based on the integrated control command (integrated control data) received from the upper-level control device 1, the upper-level PLC 81 performs modification and count correction of the synchronization data such as the operation period (T) and the intra-period time position (t). Even in this case, as compared to a case (not particularly illustrated in the drawings) where one PLC in an industrial machine 3 processes all the axis control programs (=the control operation program) to individually output control commands to the respective servo amplifier 35, the processing burden of the PLC can be greatly reduced, and the communication speed between the multiple servo amplifiers 35 and the processing speed in controlling the multiple motors 34 can be improved.

Further, in the present embodiment, in particular, as the CPU of each of the servo amplifiers 35, the multi-core processor 61 is provided that has at least the first core 62, which executes the motor control program related to the function as the motor control part 52, and the second core 63, which executes the axis control program related to the function as the axis operation control part 51. The second core 63 executes the axis control program controlling the corresponding motor 34 for the coordinated drive of the industrial machine 3 by this servo amplifier 35 and the other servo amplifiers 35.

As a result, the motor control program related to a basic function (follow-up control based on a feedback loop or the like) for controlling the motor 34 according to a command and the axis control program related to an application execution function in motor control can be respectively shared and executed in parallel (simultaneously) by the first core 62 and the second core 63 of the multi-core processor 61. In particular, in the example of the present embodiment, as the axis control program executed by the second core 63, the processing related to the coordinated drive with the other servo amplifiers 35 with respect to the industrial machine 3 is executed. As a result, even when the processing burdens of the programs are large, the programs can both be executed at the same time without reduction in their execution speeds, and a real-time property and control accuracy of the motor control by this servo amplifier 35 can be improved.

Further, in the example of the present embodiment, the application that functions based on the execution of the axis control program by the second core 63 can be interpreted as an application that is arbitrarily customized by a user (mainly a designer of an industrial machine maker). On the other hand, other applications such as a so-called gantry control and pressure feedback control that are executed according to a market or a use may be shared and processed by either the first core 62 or the second core 63 of the multi-core processor 61, or a separate dedicated core may be provided. In this way, when the servo amplifier 35 itself has an application execution function in addition to its original basic function of performing motor control, it is useful to have a structure in which the multiple cores of the multi-core processor 61 share the application execution function so as not to impair performance of the motor control function.
[0068]

7. Example of Hardware Structure of Servo Amplifier

Figure 12:
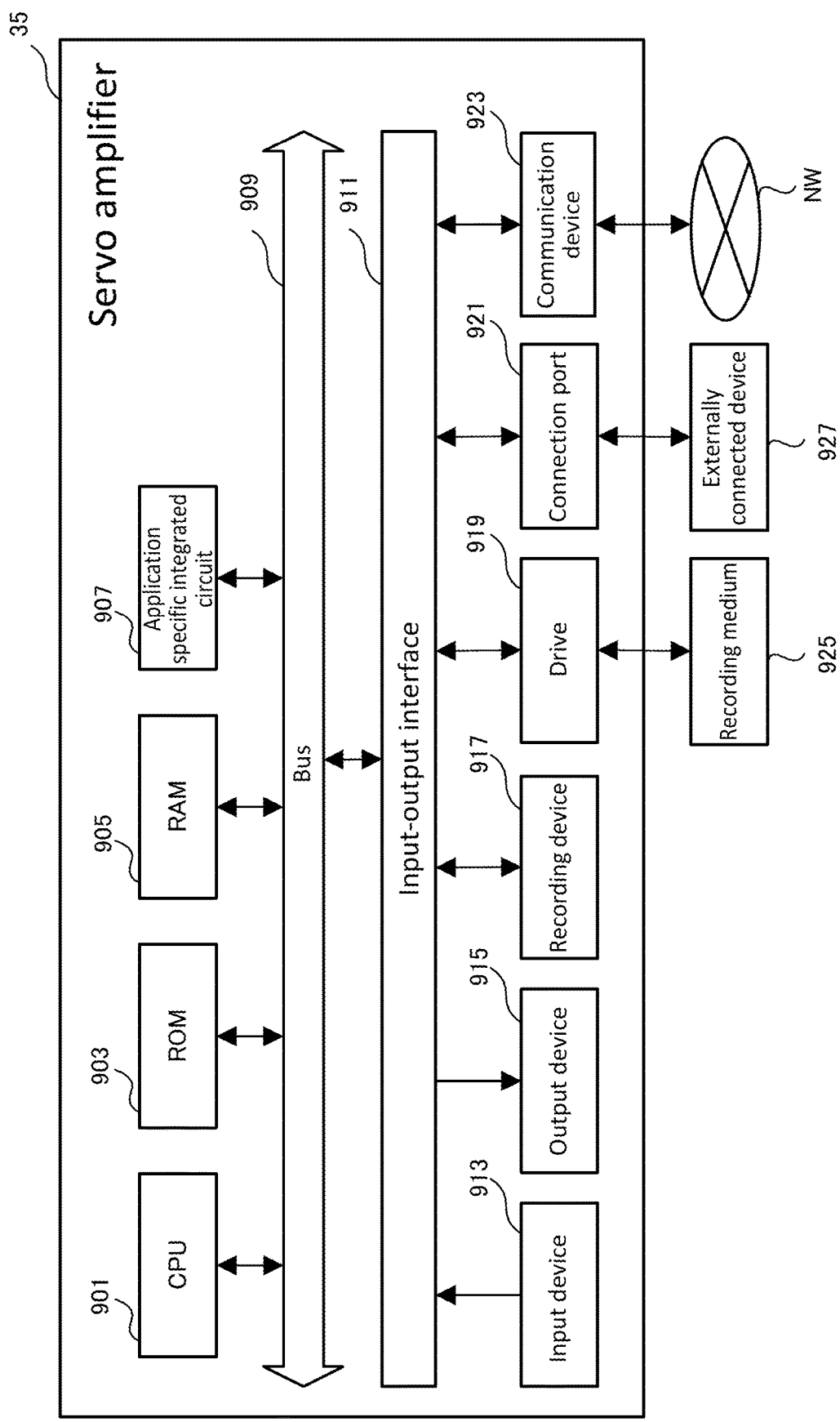
FIG. 12 is a functional block diagram illustrating an example of a hardware structure of a servo amplifier.

Next, with reference to FIG. 12, an example of a hardware structure of a servo amplifier 35 that realizes the processing by the sharing processing part 40, the referenced processing part 41, the referencing processing part 42, the control part 50, the divided loading processing part 53, the axis operation control part 51, the motor control part 52, the storage part 54, or the like implemented by the program executed by the CPU 901 described above is described. In FIG. 12, a structure related to the function of supplying drive power to the motors 34 is omitted as appropriate.

As illustrated in FIG. 12, the servo amplifier 35 includes, for example, the CPU 901, a ROM 903, a RAM 905, an application specific integrated circuit 907 such as an ASIC or an FPGA built for a specific application, an input device 913, an output device 915, a recording device 917, a drive 919, a connection port 921, and a communication device 923. These structural elements are connected via a bus 909 or an input-output interface 911 in a manner capable of transmitting a signal between each other.

The program can be recorded in, for example, the ROM 903, the RAM 905, the recording device 917, or the like.

Further, the program can be temporarily or permanently recorded in a removable recording medium 925 such as a magnetic disk (such as a flexible disk), an optical disk (such as various CD/MO disk/DVD), or a semiconductor memory. Such a recording medium 925 can also be provided as so-called package software. In this case, the program recorded in the recording medium 925 may be read out by the drive 919 and recorded in the recording device 917 via the input-output interface 911, the bus 909, or the like.

Further, the program can also be recorded, for example, at a download site, on another computer, another recording device, or the like (which are not illustrated in the drawings). In this case, the program is transmitted via a network (NW) such as an LAN or the Internet, and the communication device 923 receives the program. Then, the program received by the communication device 923 may be recorded in the recording device 917 via the input-output interface 911, the bus 909 or the like.

Further, the program can also be recorded, for example, in an appropriate externally connected device 927. In this case, the program may be transmitted via the appropriate connection port 921 and recorded in the recording device 917 via the input-output interface 911, the bus 909, or the like.

Then, the CPU 901 executes various processes according to the program recorded in the recording device 917, and thereby, the processing by the sharing processing part 40, the referenced processing part 41, the referencing processing part 42, the control part 50, the divided loading processing part 53, the axis operation control part 51, the motor control part 52, the storage part 54, or the like is realized. In this case, for example, the CPU 901 may directly read out the program from the recording device 917 and execute the program, or may load the program into the RAM 905 and then execute the program. Further, for example, when the CPU 901 receives the program via the communication device 923, the drive 919, or the connection port 921, the received program may be directly executed without being recorded in the recording device 917.

Further, when necessary, for example, the CPU 901 may perform various processes based on a signal or information input from the input device 913 such as a mouse, a keyboard, a microphone, or the like (which are not illustrated in the drawings).

Then, for example, the CPU 901 may output a result resulting from executing the above processing from the output device 915 such as a display device or an audio output device. Further, when necessary, the CPU 901 may transmit the processing result via the communication device 923 or the connection port 921, or may record the processing result in the recording device 917 or on the recording medium 925.

In Japanese Patent Application Laid-Open Publication No. 2008-178236, a function as a master is assigned to one of the multiple inverters and a function as a slave is assigned to each one of the remaining inverters. That is, the role of the PLC in the above-described original structure is merely taken over by the one inverter described above, that functions as a master, and it is not that multiple motor control devices perform data communication with each other on an equal footing. For example, the multiple inverters that function as slaves cannot directly communicate data with each other, and data can only be transmitted and received via the one inverter that functions as a master. Therefore, when controlling multiple motors, communication delays occur between the master and the slaves, and there is room for improvement in improving motor control performance. Further, since the functions of the master and the slaves are different, there is room for improvement in that the motor control devices lack general versatility.

A distributed motor control system, a motor control device, and a motor control method according to embodiments of the present invention allow a processing speed in controlling multiple motors to be improved.

According to one aspect of the present invention, a distributed motor control system is applied that includes multiple motor control devices that individually control multiple motors that coordinately drive an industrial machine. Each of at least two motor control devices included in the multiple motor control devices has a first sharing processing part that performs sharing processing for sharing coordinated control data required for coordinated drive of the industrial machine between the at least two motor control devices via data communication, and a control part that controls the corresponding motor using the coordinated control data that has been sharing-processed.

Further, according to another aspect of the present invention, a motor control device is applied that controls one of multiple motors that coordinately drive an industrial machine. The motor control device includes: a sharing processing part that performs sharing processing for sharing coordinated control data with other motor control devices via data communication, the coordinated control data being required for coordinated drive with the motor control devices that coordinately drive the industrial machine; and a control part that controls the one motor using the coordinated control data that has been processed by the sharing processing.

Further, according to another aspect of the present invention, a distributed motor control method is applied that is executed by a distributed motor control system having multiple motor control devices that individually control multiple motors that coordinately drive an industrial machine. The distributed motor control method includes: sharing with each other via data communication between at least two motor control devices included in the multiple motor control devices coordinated control data required for coordinated drive of the industrial machine; and respectively controlling the corresponding motors by the at least two motor control devices using the shared coordinated control data.

According to an embodiment of the present invention, the processing speed when controlling multiple motors can be improved.

In the above description, when there is a description such as "vertical," "parallel," "flat surface," or the like, the description is not in a strict sense. That is, "vertical," "parallel" or "flat surface" means "substantially vertical," "substantially parallel" or "substantially flat surface," when tolerances and errors in design and in manufacturing are within allowed ranges.

Further, in the above description, when there is a description such as that an external dimension or size is "identical," "equal," "different," or the like, the description is not in a strict sense. That is, "identical," "equal" or "different" means "substantially identical," "substantially equal" or "substantially different" when tolerances and errors in design and in manufacturing are within allowed ranges.

However, unlike the above, for example, when there is a description about a value as a predetermined decision criterion or a value for specifying a range, such as a threshold or a reference value, for these values, a description such as "identical," "equal," "different," or the like is in a strict sense.

Obviously, numerous modifications and variations of the present invention are possible in light of the above teachings. It is therefore to be understood that within the scope of the appended claims, the invention may be practiced otherwise than as specifically described herein.

What is claimed is:

1. A distributed motor control system, comprising:
   a plurality of motor control devices that individually controls a plurality of motors configured to coordinately drive an industrial machine,
   wherein each of at least two motor control devices of the plurality of motor control devices includes processing circuitry configured to perform sharing processing including sharing coordinated control data, used in coordinated driving of the industrial machine between the at least two motor control devices, via data communication, and control a corresponding motor using the coordinated control data shared via the sharing-processing, and the processing circuitry is configured to render the coordinated control data, processed by the motor control devices, referenceable by a second motor control device other than the respective one of the motor control devices, and reference the coordinated control data that has been rendered referenceable by the second motor control device and is processed by the second motor control device.

2. The distributed motor control system according to claim 1, wherein the industrial machine has a plurality of mechanism elements, the plurality of motors in coordination with each other is configured to respectively drive a plurality of drive axes connected to the plurality of mechanism elements respectively, and the processing circuitry of the at least two motor control devices is configured to control the corresponding motors respectively by implementing a plurality of axis control programs that corresponds to the plurality of drive axes respectively.

3. The distributed motor control system according to claim 2, further comprising:
   an external device configured to generate a control operation program including the plurality of axis control programs,
   wherein each of the at least two motor control devices further includes a storage configured to store an axis control program that is generated by the external device and that corresponds to a respective one of the motor control devices.

4. The distributed motor control system according to claim 3, wherein the processing circuitry of each of the at least two motor control devices is further configured to perform the sharing processing including sharing with each other, the coordinated control data that is stored in the storage of the respective one of the motor control devices and that has been processed by the axis control program, via data communication between the at least two motor control devices, and control, based on the axis control program stored in the storage of the respective one of the motor control devices, the corresponding motor using the coordinated control data shared by the sharing processing.

5. The distributed motor control system according to claim 4, wherein the processing circuitry of each of the at least two motor control devices is further configured to render the coordinated control data, processed by the axis control program of the respective one of the motor control devices, referenceable by a second motor control device other than the respective one of the motor control devices via the data communication.

6. The distributed motor control system according to claim 5, wherein the processing circuitry of each of the at least two motor control devices is further configured to reference, via the data communication, the coordinated control data that has been rendered referenceable by the second motor control device other than the respective one of the motor control devices and that is processed by an axis control program of the second motor control device.

7. The distributed motor control system according to claim 6, wherein the processing circuitry of each of the at least two motor control devices is further configured to load, from the external device, the axis control program that is generated corresponding to the respective one of the motor control devices by dividing the control operation program held in the external device, and the storage is further configured to store the axis control program loaded by the processing circuitry.

8. The distributed motor control system according to claim 5, wherein the processing circuitry of each of the at least two motor control devices is further configured to load, from the external device, the axis control program that is generated corresponding to the respective one of the motor control devices by dividing the control operation program held in the external device, and the storage is further configured to store the axis control program loaded by the processing circuitry.

9. The distributed motor control system according to claim 4, wherein the processing circuitry of each of the at least two motor control devices is further configured to load, from the external device, the axis control program that is generated corresponding to the respective one of the motor control devices by dividing the control operation program held in the external device, and the storage is further configured to store the axis control program loaded by the processing circuitry.

10. The distributed motor control system according to claim 3, wherein the processing circuitry of each of the at least two motor control devices is further configured to load, from the external device, the axis control program that is generated corresponding to the respective one of the motor control devices by dividing the control operation program held in the external device, and the storage is further configured to store the axis control program loaded by the processing circuitry.

11. The distributed motor control system according to claim 3, wherein the processing circuitry of each of the at least two motor control devices is further configured to load, from the external device, an entirety of the control operation program that is held in the external device and that includes the axis control program corresponding to the respective one of the motor control devices, and the storage is further configured to store only the axis control program corresponding to the respective one of the motor control devices in the control operation program loaded by the processing circuitry.

12. The distributed motor control system according to claim 3, wherein the control operation program, held in the external device, is displayed in a mode including the plurality of axis control programs in a display of the external device, and is structured to be editable.

13. The distributed motor control system according to claim 3, wherein the coordinated control data includes synchronization data for synchronizing coordinated drive between respective ones of the motors that are respectively driven by the at least two motor control devices.

14. The distributed motor control system according to claim 1, further comprising:
an upper-level control device configured to collectively control the industrial machine,
wherein the upper-level control device includes a first communication path for sharing integrated control data with one of the plurality of motor control devices, at least two motor control devices included in the plurality of motor control devices include a second communication path for sharing the coordinated control data, and communication speeds of the first communication path and the second communication path are different from each other.

15. The distributed motor control system according to claim 1, further comprising:
an equipment control device configured to collectively control the plurality of motor control devices that individually controls a plurality of motors that configured to coordinately drive the industrial machine,
wherein the equipment control device includes second processing circuitry configured to perform share processing including sharing the coordinated control data between the at least two motor control devices.

16. A motor control device for controlling one of a plurality of motors that coordinately drive an industrial machine, comprising:
processing circuitry configured to perform sharing processing including sharing coordinated control data with other motor control devices via data communication, and control the one of the motors using the coordinated control data shared via the sharing processing,
wherein the coordinated control data is used in coordinated driving with the other motor control devices that coordinately drive the industrial machine with the motor control device, and the processing circuitry is configured to render the coordinated control data, processed by the motor control device, referenceable by a second motor control device other than the motor control device, and reference the coordinated control data that has been rendered referenceable by the second motor control device and is processed by the second motor control device.

17. The motor control device according to claim 16, wherein the processing circuitry is a multi-core processor having at least a first area that executes a first program related to a basic function in motor control and a second area that executes a second program related to a use-specific application in motor control, and the second area executes the second program controlling the one motor by coordinately driving the industrial machine using the motor control device and the other motor control devices.

18. A distributed motor control method executed by a distributed motor control system having a plurality of motor control devices that individually controls a plurality of motors configured to coordinately drive an industrial machine, comprising:
sharing, via data communication between at least two motor control devices in the plurality of motor control devices, coordinated control data used in coordinated driving of the industrial machine; and
respectively controlling corresponding motors by the at least two motor control devices using the shared coordinated control data,
wherein the sharing includes rendering the coordinated control data, processed by the motor control devices, referenceable by a second motor control device other than a respective one of the motor control devices, and referencing the coordinated control data that has been rendered referenceable by the second motor control device and is processed by the second motor control device.

19. The distributed motor control method according to claim 18, wherein the rendering comprises rendering the coordinated control data, processed by an axis control program of the respective one of the plurality of motor control devices, referenceable by a second motor control device other than the respective one of the motor control devices via the data communication.

20. The distributed motor control method according to claim 19, wherein the referencing comprises referencing, via the data communication, the coordinated control data that has been rendered referenceable by the second motor control device other than the respective one of the motor control devices and that is processed by an axis control program of the second motor control device.

* * * * *